(12) United States Patent
Kroop et al.

(10) Patent No.: US 11,990,254 B2
(45) Date of Patent: May 21, 2024

(54) HIGH-VOLTAGE CABLE DISTRIBUTOR

(71) Applicant: NEXANS, Courbevoie (FR)

(72) Inventors: Tobias Kroop, Floss (DE); Christoph Frank, Floss (DE); Thomas Schneider, Floss (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/945,121

(22) Filed: Sep. 15, 2022

(65) Prior Publication Data
US 2023/0092661 A1    Mar. 23, 2023

(51) Int. Cl.
*H02G 15/105*    (2006.01)
*H01B 7/00*    (2006.01)

(52) U.S. Cl.
CPC ......... *H01B 7/0045* (2013.01); *H02G 15/105* (2013.01)

(58) Field of Classification Search
CPC .......................... H01B 7/0045; H02G 15/105
USPC ....................................................... 174/73.1
See application file for complete search history.

(56) References Cited

U.S. PATENT DOCUMENTS

| 9,906,003 | B1 | 2/2018 | Volpone et al. | |
| 9,979,167 | B1 * | 5/2018 | Volpone | H01B 13/01263 |
| 2015/0114711 | A1 | 4/2015 | Dew et al. | |
| 2016/0344176 | A1 * | 11/2016 | Dew | H02G 1/14 |
| 2019/0109447 | A1 * | 4/2019 | Patz | H02G 3/16 |
| 2020/0303841 | A1 | 9/2020 | Doring et al. | |
| 2020/0412120 | A1 * | 12/2020 | Volpone | H01R 4/726 |

FOREIGN PATENT DOCUMENTS

EP    0272 806    3/1994

OTHER PUBLICATIONS

European Search Report dated Feb. 24, 2022.

* cited by examiner

*Primary Examiner* — Timothy J Thompson
*Assistant Examiner* — Michael F McAllister
(74) *Attorney, Agent, or Firm* — Sofer & Haroun, LLP

(57) ABSTRACT

A cable distributor for individual cables that are shielded by an electrically conductive shield. The cable distributor has an electrically insulating outer housing, which receives a connection piece at which at least two individual cables are connected to each another. The shields of the connected individual cables are connected to each other by means of an electrically conductive shield housing, as a result of which a continuous shielding of the current-carrying parts of the cable distributor is achieved. A method for producing such a cable distributor is also proposed.

13 Claims, 5 Drawing Sheets

HIGH-VOLTAGE CABLE DISTRIBUTOR

RELATED APPLICATION

This application claims the benefit of priority from European Patent Application No. 21 306 305.0, filed on Sep. 21, 2021, the entirety of which is incorporated by reference.

FIELD

The invention relates to a cable distributor for individual shielded cables, and to a method for producing such a cable distributor.

BACKGROUND

Shielded individual electrical cables are used, for example, in the automotive sector to connect electrical assemblies and components to each other. For this, cable distributors are used, which branch the cables going out from a battery or a generator to a plurality of cables, which in turn lead to electrical loads. In order to achieve savings in material and weight, there is an observable general tendency towards ever higher operating voltages, which allow for smaller cable cross-sections. This applies in particular to vehicles that have a purely electric drive or that have a hybrid drive. In such vehicles, devices and loads are therefore increasingly supplied from power sources with higher voltage. The power sources used for this can be designed for voltages of up to 1000 V. Loads in electric vehicles are, for example, a drive motor and heating devices. Because of the high operating voltages, individual cables that have with an electrically active shield are often used to connect loads to a battery. In the area of the cable distributor it is therefore necessary to contact the shields of the individual cables and, in addition, also to shield the connection pieces of the individual cables in order to achieve continuous shielding of the electrical fields generated by the high operating voltages.

OBJECTS AND SUMMARY

Proceeding from this, the object of the present invention is to create a cable distributor that is of a simple design and at the same time fulfils the requirements described at the beginning.

To achieve this object, the invention proposes, according to a first aspect, a cable distributor for individual cables that are shielded by an electrically conductive shield. The cable distributor has an electrically insulating outer housing, which receives a connection piece at which at least two individual cables are electrically connected to each another. The shields of the connected individual cables are connected to each other by means of an electrically conductive shield housing.

The shield housing encloses the entire area where the individual cables are connected to each other and in this way provides effective shielding from electrical fields, which is advantageous in particular in the case of high operating voltages of the individual cables.

In the case of one exemplary embodiment of the invention, there are conical support sleeves arranged under the shields of the individual cables. The conical support sleeves raise the shields of the individual cables and thereby simplify the electrical contacting of the shields.

The conical support sleeves may advantageously have a collar at one end. The collar forms a stop for the shields of the individual cables when the support sleeves are pushed under the shields.

In the case of a particularly advantageous exemplary embodiment, the cable distributor has electrically conductive connection components that are provided with receivers, the surfaces of which are realized so as to be complementary to the shape of the conical support sleeves. The connection components are arranged between the individual cables to be electrically connected, and effect an electrical contact to the shields of the individual cables. By means of the connection components it is possible, merely by pressing the connection components onto the support sleeves, to effect a reliable contact to the shields of all individual cables that are guided through the contact element. This provides for easy assembly.

In the case of a development of the invention, the cable distributor has a plurality of connection pieces of individual cables, which are separated from each other by an insulating insert. The insulating insert ensures that no short-circuit occurs inside the cable distributor as a result of touching of contact points or conductors that are at a different electrical potential.

The shield housing is advantageously realized as a single part. The one-piece shield housing is simple and inexpensive to produce. In particular, the shield housing can be produced from an electrically conductive shield plate.

In the case of an expedient embodiment, the outer housing of the cable distributor is fixed by retaining caps at a position where it encloses the shield plate. The retaining caps may, for example, be mounted on the outer housing, without use of tools, by means of latching means.

In the case of an advantageous embodiment, the outer housing has resilient tabs that clamp an insulation of an individual cable. This design allows the outer housing to provide strain relief for the individual cables.

In the case of a development of the cable distributor, arranged on the outer housing there is a fixing element, which has resilient tabs that clamp the insulation of an individual cable. By means of the fixing element, a strain relief is formed on an opposite side of the outer housing, where it is not possible to attach resilient tabs to the outer housing itself.

Advantageously, the retaining caps have through-openings for the individual cables and are realized in such a manner that the retaining caps compress the resilient tabs arranged on the outer housing, or on the fixing element. In this way, strain reliefs for the individual cables are provided on both sides of the outer housing without the need for additional assembly steps. This means that, when the retaining caps are placed on the outer housing and locked in place, the outer housing is simultaneously positioned and a strain relief is formed for each individual cable.

Proposed according to a second aspect of the invention is a method for assembling a cable distributor according to the first aspect of the invention. The method comprises the following steps:

stripping the insulation from the individual cables to be connected;
shortening the shields of the individual cables;
pushing on the conical support sleeves under the shields of the individual cables;
connecting the conductors of the individual cables in an electrically conductive manner;
mounting an electrically insulating insert such that one or more connection points are electrically insulated;
pressing the connection components onto the conical support sleeves;
pushing a shield housing over the connection components and the insert;

positioning an outer housing over the shield housing; and fixing the outer housing by means of retaining caps.

The method according to the invention enables a cable distributor according to the invention to be produced in a simple and reliable manner.

In the case of a development, the method further comprises the step that, following positioning of the outer housing, a fixing element is additionally positioned. The fixing element positions the individual cables and acts in combination with a retaining cap to provide a strain relief for the individual cables.

Proposed according to a third aspect of the invention is a wiring harness, comprising a plurality of individual cables and a cable distributor according to the first aspect of the invention.

BRIEF DESCRIPTION OF THE DRAWINGS

The invention is explained in more detail in the following, by way of example, on the basis of an embodiment and with reference to the accompanying figures. All figures are purely schematic, and not to scale.

In the figures, elements that are the same or similar are denoted by the same or similar references.

DETAILED DESCRIPTION

In the context of the present application, an individual cable is understood to be a cable that has a single conductor surrounded by insulation. The conductor may be realized as a solid conductor or as a stranded conductor. In the present case, the individual cable also has an electrically conductive shield.

Figure 1:
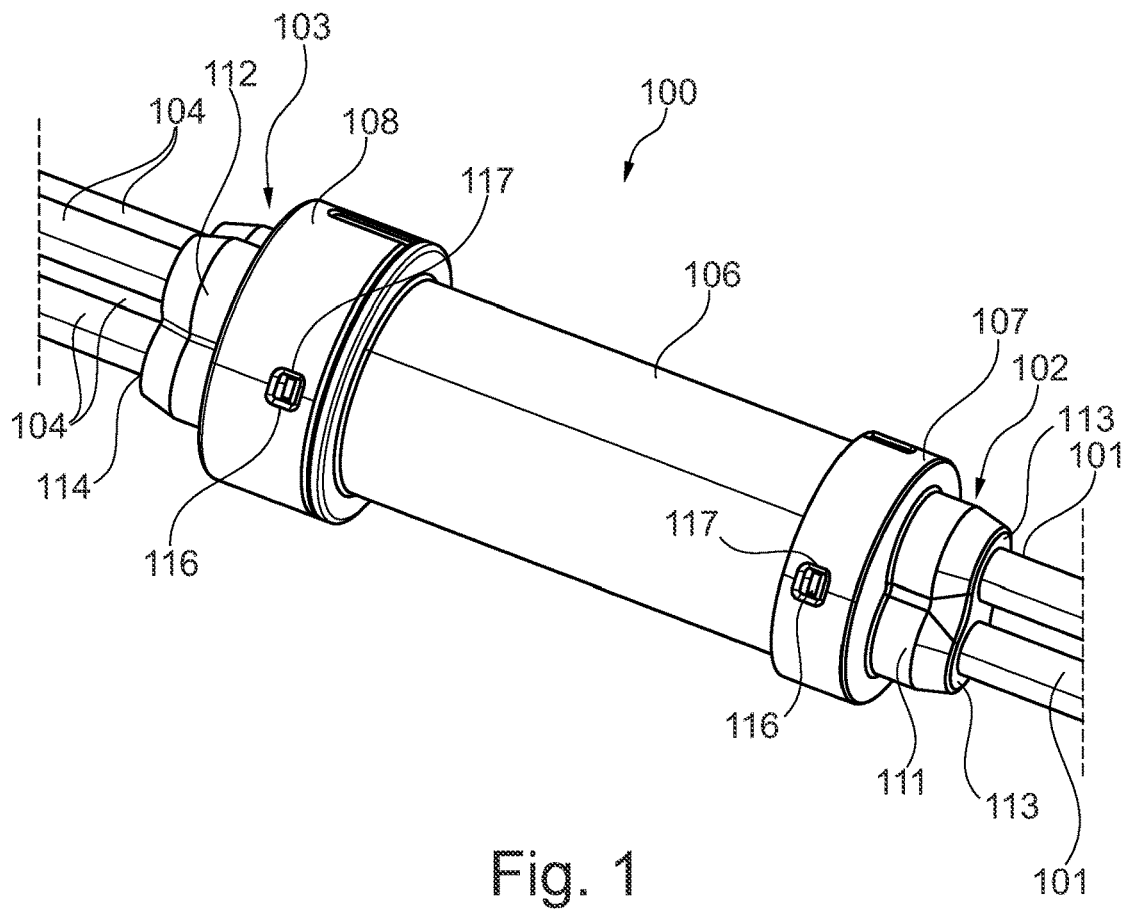
FIG. 1 shows a general view of a cable distributor according to the invention.

FIG. 1 shows a cable distributor 100 according to the invention in a perspective general view, from the outside. The cable distributor has two incoming cables 101, which lead at one end 102 into the cable distributor 100 and are connected, for example, to a battery in an electric vehicle. At another end 103, four outgoing cables 104 lead out of the cable distributor 100. The outgoing cables 104 are connected, for example, to electrical loads in the electric vehicle. Such loads are, for example, drive motors, actuators and heating and cooling systems. The cables 101,104 are individual shielded cables. The electrical shield of the individual cables shields the electrical fields generated by the high electrical operating voltages. In the case of the exemplary embodiment represented, one incoming cable 101 is connected, respectively, to two outgoing cables 104 at two connection pieces V (FIG. 2), which are received in an insulating cylindrical outer housing 106. The connection pieces are described in further detail below. Arranged at the ends 102,103 of the outer housing 106 there are retaining caps 107 and 108, respectively, which position the outer housing 106 over the connection pieces. The retaining caps 107,108 are provided with protrusions 111,112, which have through-openings 113,114 for the individual cables 101 and 104 respectively. The function of the protrusions 111,112 on the retaining caps 107,108 is explained further below in connection with FIG. 6. In order to connect the outer housing 106 to the retaining caps 107,108, the outer housing 106 has latching lugs 116 that latch into corresponding openings 117 provided in the retaining caps 107,108. The outer housing is produced, for example, from fibre-reinforced plastic, in particular from a plastic having the designation PA66 GF35.

Although the invention is described with reference to an exemplary embodiment that has two incoming cables 101 and four outgoing cables, the invention is not limited to this. In the case of other exemplary embodiments, more or fewer than two incoming cables 101, more or fewer than four outgoing cables 104, and more or fewer than two connection pieces V are provided. Moreover, in the case of other exemplary embodiments, more or fewer than two outgoing cables 104 are connected to an incoming cable 101 at a connection point V. The exact number of incoming cables, outgoing cables and connection pieces V is not significant to the invention.

Figure 2:
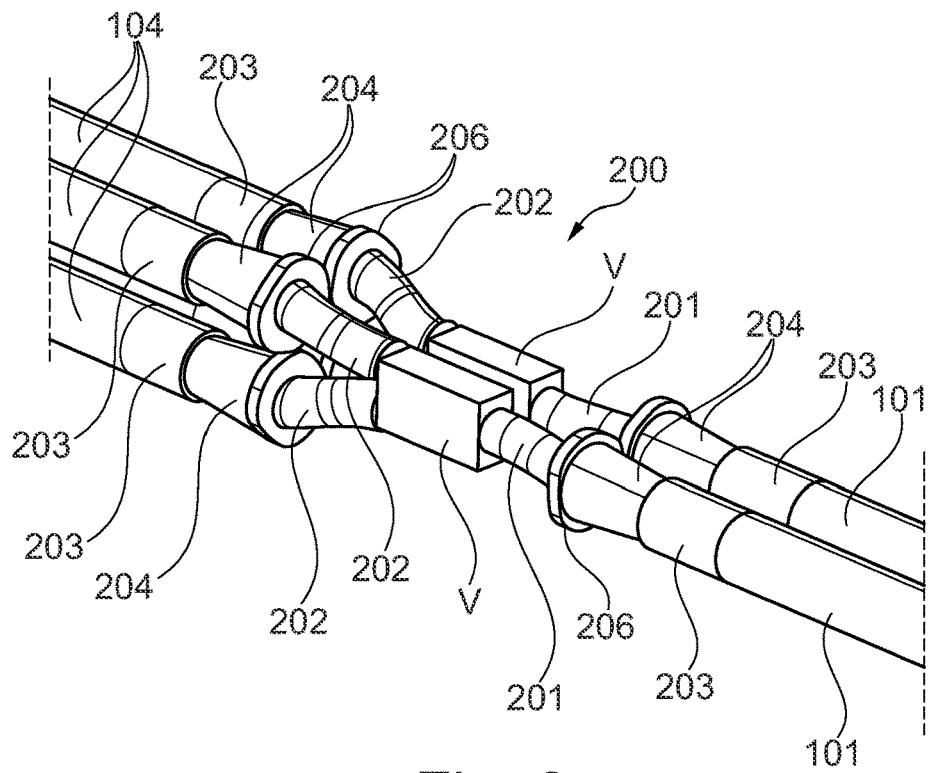
FIG. 2 shows an arrangement of connection pieces and the individual cables connected in the cable distributor from FIG. 1.

Illustrated in FIG. 2 is an arrangement 200 composed of two connection pieces V, at each of which a conductor 201 is connected to two conductors 202 of two outgoing individual cables 104. The connection pieces V are rectangular metal bodies that have a through hole, into which the conductors 201,202 are inserted and welded to the connection pieces V. The connection pieces V form connection points between the conductors. Outside the connection pieces V, the conductors 201,202 are still represented with an insulation, which insulates the conductor against an electrically conductive shield 203. There are conical support sleeves 204 arranged on the individual cables 101 and 104. The conical support sleeves 204 have the shape of a truncated cone. The thinner end of the truncated cone is pushed under the shield 203 in such a manner that the shield 203 rests on a conical peripheral surface of the support sleeves 204. For better illustration, the shield 203 is represented shortened in FIG. 2, such that only a small piece of the thinner end of the support sleeves 204 is covered by the shield 203. In this way, the support sleeves 204 are more visible to the viewer in FIG. 2. At their thicker end, the support sleeves 204 have a collar 206, which forms a stop for the shield 203.

Figure 3A:
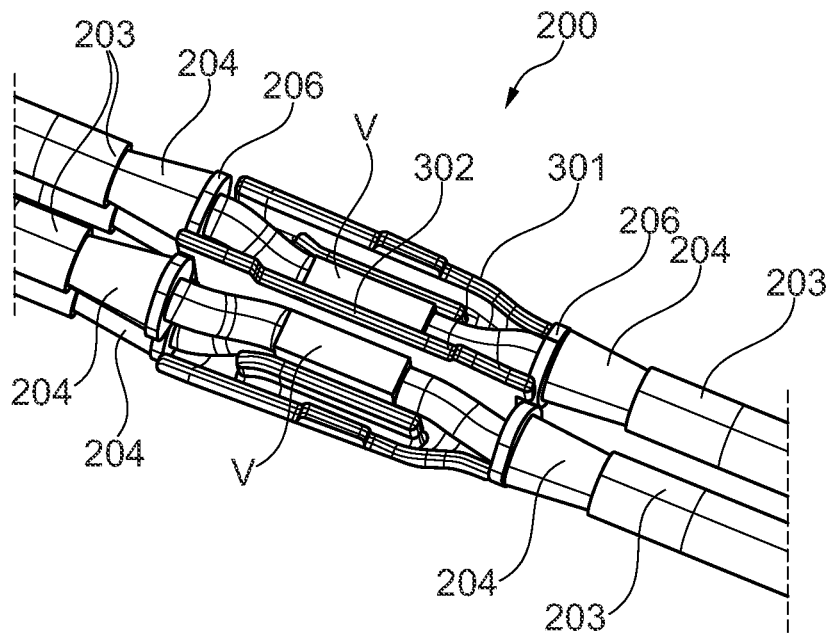
FIG. 3A shows the arrangement from FIG. 2 with an insulating insert half arranged around the connection pieces.

FIG. 3A shows the arrangement 200 in a perspective view from above. An insert half 301 made of electrically insulating material extends between the collars 206 of the support sleeves 204 and surrounds the conductors 201,202 as well as the connection pieces V. The insert half 301 has a partition wall 302 that separates the connection pieces V from each other so that a short circuit between the connection pieces V is safely prevented.

Figure 3B:
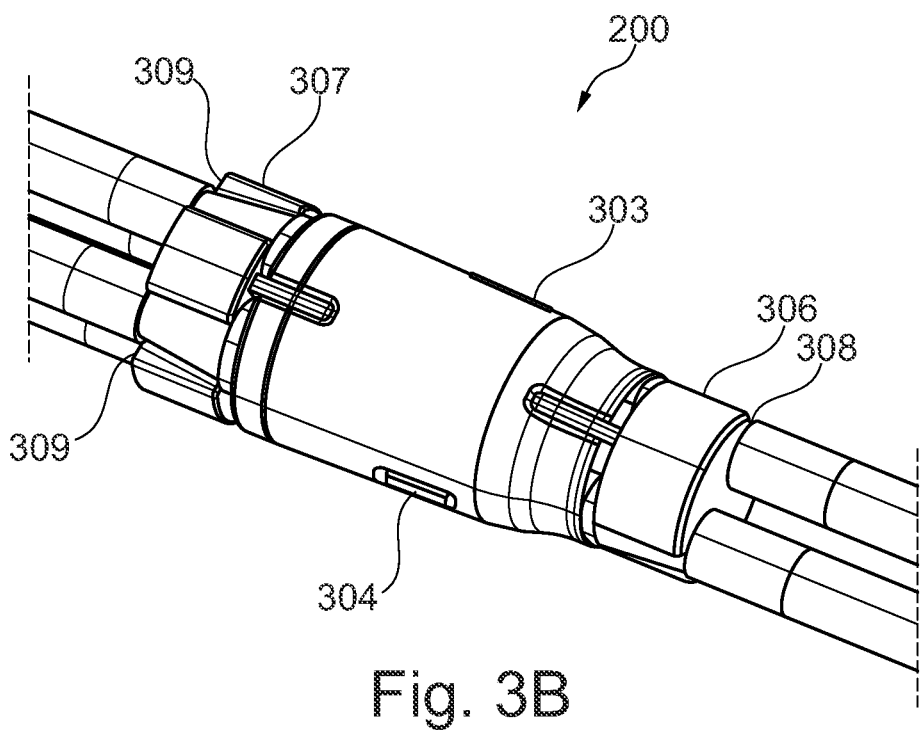
FIG. 3B shows the arrangement from FIG. 3A with a fully closed insert and with connection components.

FIG. 3B shows the arrangement 200 from FIG. 3A with a further insert half 303, which is placed on the insert half 301 and latched to it by latching means 304. The insert half 303 also has a partition wall 302, which is not visible in FIG. 3B, and adjoins the partition wall 302 of the insert half 301 so that a continuous partition, which electrically separates the connection pieces V from one another, is created in an interior space enclosed by the insert halves 301, 303. The insert halves 301,302 form an insulating housing around the connection pieces V. There are electrically conductive connection components 306,307 pressed onto the support sleeves 204. The connection components 306,307 are made of copper, for example. For this purpose, the connection components 306,307 have receivers 308,309 which are shaped so as to be complementary to the outer contour of the support sleeves 204. As a result of pressing-on of the connection components 306,307, the shields 203 of the individual cables 201,202 are contacted, as explained in more detail below with reference to FIGS. 4A and 4B.

Figure 4A:
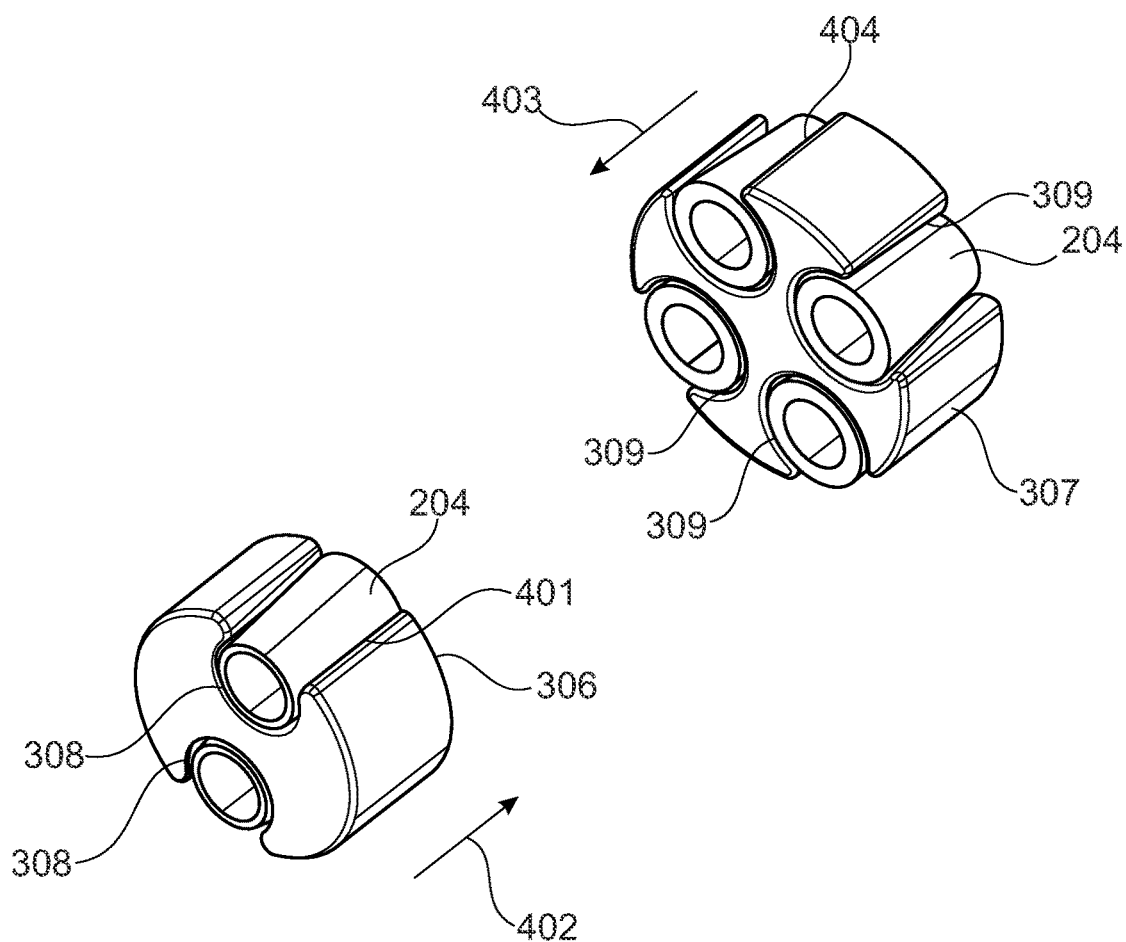
FIG. 4A shows connection components pressed onto support sleeves.

FIG. 4A illustrates the two connection components 306, 307. There are receivers 308 arranged in the connection component 306. The receivers 308 are open at the outer circumference of the connection component 306, for example at a circumferential angle of the support sleeves 204 of approximately 90°, so that a slot-shaped opening 401 is formed. The opening 401 extends in the circumferential direction of the connection component 306 only to such an extent that the support sleeve 204 cannot fall out of the receiver 308. The receivers 308 have a conical shape that corresponds to the outer contour of the support sleeves 204. When the connection component 306 is pressed onto the support sleeves in the direction of the arrow 402, the inner wall of the receiver 308 exerts a pressing force upon the peripheral wall of the support sleeves 204.

The same applies to the connection component 307, which has four receivers 309 for support sleeves 204. The receivers 309 of the connection component 307 are shaped in the same way as the receivers 308 of the connection component 306. Therefore, when the connection component 307 is pressed in the direction of the arrow 403, the inner wall of the receiver 309 exerts a pressing force upon the peripheral wall of the support sleeves 204. This feature is utilized to electrically contact the shields of the individual cables 201, 202 to the connection components 306, 307, as explained with reference to FIG. 4B. Like the connection component 306, the connection component 307 also has slot-shaped openings 404, the size of which is limited so that the support sleeves 204 cannot fall out of the receivers 309. The openings 401 and 404 make it easier to fit the connection components 306,307 onto the support sleeves 204.

Figure 4B:
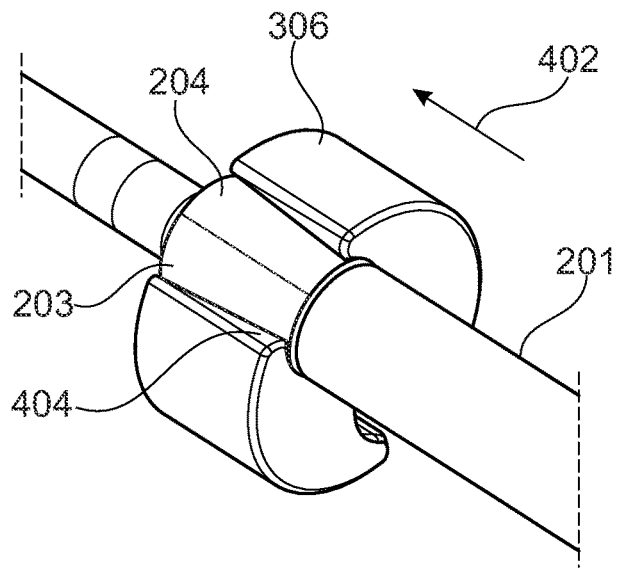
FIG. 4B shows an enlarged detail from FIG. 3B.

FIG. 4B shows an enlarged detail from FIG. 3B. The detail shows the connection component 306, which is pressed onto a support sleeve 204 that is arranged on the individual cable 201. The shield 203 lies on the outer circumference of the support sleeve 204 and is electrically contacted by the connection component 306. In this way, an electrical contact is produced from the connection component 306 to the shields 203 of the incoming cables 201. Similarly, the connection component 307 effects an electrical contact to the shields 203 on the outgoing cables 202.

In the connection components, the number of respective receivers is adjusted to the number of incoming cables or outgoing cables, so that there is one receiver available for each cable.

Figure 5:
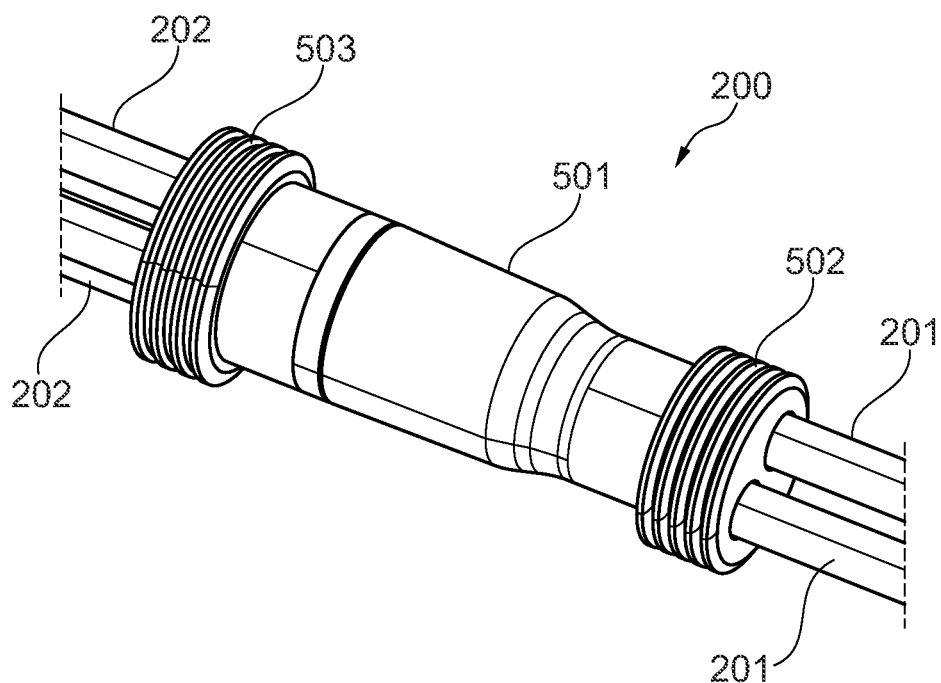
FIG. 5 shows the arrangement from FIG. 3B with a shield plate and seals for the individual cables.

FIG. 5 shows the arrangement 200 from FIG. 3B with a single-part shield housing or shield plate 501, preferably made of an electrically conductive metal sheet, arranged over the connection components 306, 307 and the insert halves 301, 303. The shield plate 501 is produced in one piece and has a length in the axial direction such that the shield plate 501 is substantially flush with the connection components 306,307. The shield plate 501 sits tightly on the connection components 306,307 and thereby effects an electrical contact to the connection components 306,307. The shield plate 501 is conductively connected to the shields 203 of the individual cables 101, 104 via the connection components 306, 307. As a result, a continuous shielding of all current-carrying parts in the cable distributor is achieved.

At the front ends of the shield plate 501 and adjoining the connection component 306,307, a seal 502 is pushed onto the incoming cables 201 and a seal 503 onto the outgoing cables 202. The seals 502,503 are made, for example, from silicone.

Figure 6:
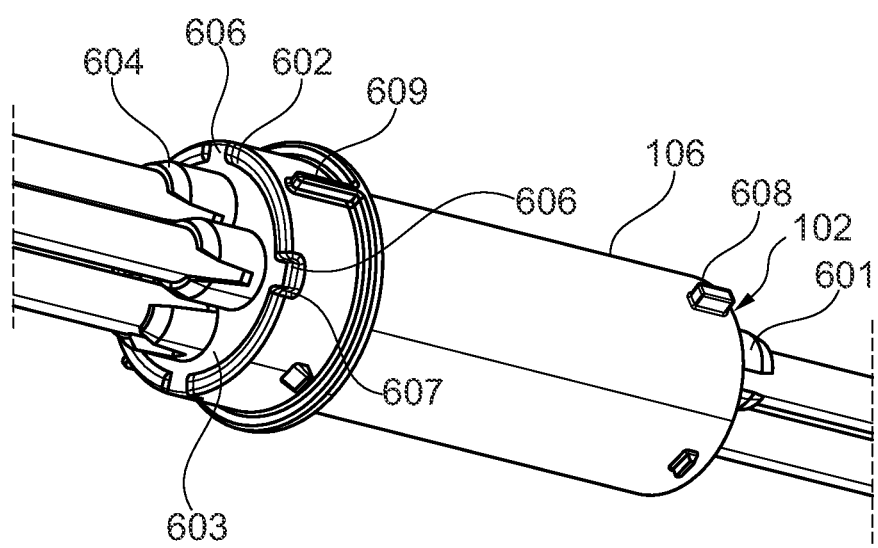
FIG. 6 shows the arrangement from FIG. 5 with a pushed-on outer housing and a fixing element.

As can be seen in FIG. 6, the outer housing 106 is arranged over the shield plate 501 and the seals 502, 503. At the end 102, arranged on the outer housing 106 there are resilient tabs 601 that cause the individual cables 201 to be fixed in place when the retaining cap 107 is placed on the outer housing 106. The protrusion 111 on the retaining cap 107 is dimensioned so that the resilient tabs 601 are compressed and clamp an insulation of the individual cables 101, thereby forming a strain relief for the individual cables 101. There is a fixing element 602 placed on the outgoing cables 104. The fixing element 602 is formed by a disc 603, from which two resilient tabs 604 extend for each outgoing cable 104. When the retaining cap 108 is placed on the outer housing 106, the protrusion 112 on the retaining cap 108 compresses the resilient tabs 604, which clamp an insulation of the outgoing cables 104 and thus provide a strain relief for the outgoing cables 104. Provided on the disc 603 there are radial projections 606, which engage in corresponding recesses 607 in the end face of the outer housing 106 and thus determine the rotational position of the fixing element 602. The outer housing 106 is provided with guide strips 608,609, which engage in corresponding slots in the retaining caps 107,108 and, together with the latching lugs 116 and the latching openings 117, define the rotational position of the retaining caps 107,108.

Figure 7:
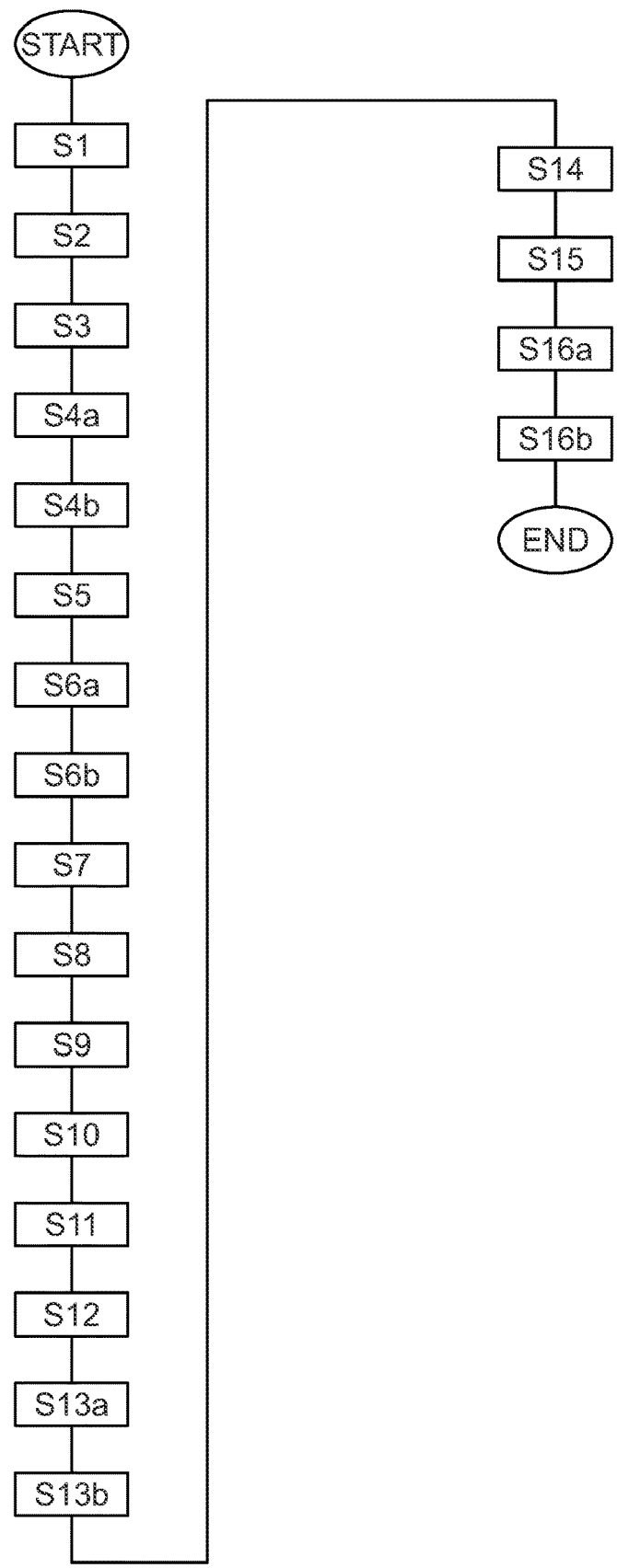
FIG. 7 shows a schematic flow diagram for a method of producing a cable distributor according to the invention.

FIG. 7 illustrates a flow chart for a method for producing a cable distributor according to the invention. In a first step Si, the retaining cap 107 is fitted onto, or parked on, the incoming cables 101, and the retaining cap 108 is fitted onto, or parked on, the outgoing cables 104. In a step S2, the fixing element 602 is parked on the outgoing cables 104 with the resilient tabs foremost. In a step S3, the outer housing 106 is parked on the incoming cables 101 with the resilient tabs 601 foremost. In a step S4a, the seal 502 is parked on the incoming cables 101, and in a step S4b the seal 503 is parked on the outgoing cables 104. Then, in a step S5, the shield plate 501 is pushed onto the incoming cables 101. In a step S6a, the connection component 306 is pushed onto the incoming cables 101, and in a step S6b the connection component 307 is pushed onto the outgoing cables. In a step S6, the insulation is stripped from the individual cables 101,104 and the shield 203 of the individual cables is shortened. In a step S8, the conical support sleeves 204 are pushed under the shields 203 of the individual cables. In a step S9, the conductors 201,202 of the individual cables are welded to respectively one of the connection pieces V. In a step S10, the insert halves 301,303 are mounted and locked together. In a step S11, the connection components 306,307 are pushed onto the support sleeves 204 where they are seated with a press-fit, such that the shields 203 of the individual cables 101,104 are contacted by the connection components. In a step S12, the shield plate 501 is pushed over the connection component 306,307 and the insert halves 301,303, such that the ends of the shield 501 are flush with the connection components. In a step 513a, the seal 502 is pushed against the connection component 306, and in a step 513b, the seal 503 is pushed against the connection component 307, such that the seals bear against the connection components. In a step S14, the outer housing 106 is positioned such that the arrangement completed thus far is received inside the outer housing. In a step S15, the fixing element 602 is positioned on the outer housing such that the projections 606 of the fixing element 602 engage in the recesses 607 of the outer housing. Finally, in a step S16a, the retaining cap 107 and, in a step S16b, the retaining cap 108 are locked to the outer housing 106.

In the claims, the words "have" and "comprise" do not exclude other elements or steps, and the indefinite article "a/an" does not exclude a plurality.

| List of references | |
|---|---|
| 100 | cable distributor |
| 101 | incoming cables |
| 102 | end of the cable distributor |
| 103 | end of the cable distributor |
| 104 | outgoing cables |
| 106 | outer housing |
| 107, 108 | retaining caps |
| 111, 112 | protrusions |
| 113, 114 | through-openings |
| 116 | latching lugs |
| 117 | openings |
| 200 | arrangement |
| 201, 202 | conductor |
| 203 | shield |
| 204 | support sleeves |
| 206 | collar |
| 301, 303 | insert half |
| 302 | partition wall |
| 306, 307 | connection component |
| 308, 309 | receiver |
| 401 | opening |
| 402, 403 | arrow |
| 404 | opening |
| 501 | shield housing/shield plate |
| 502, 503 | seals |
| 601 | resilient tabs |
| 602 | fixing element |
| 603 | disc |
| 604 | resilient tabs |
| 606 | projections |
| 607 | recesses |
| 608, 609 | guide strips |
| V | connection piece |

The invention claimed is:

1. A cable distributor for individual cables that are shielded by an electrically conductive shield, the cable distributor comprising:
    an electrically insulating outer housing, which receives a connection piece at which the conductors of at least two individual cables are electrically connected to one another,
    wherein the shields of the connected individual cables are connected to each other by means of an electrically conductive shield housing, and
    wherein there are conical support sleeves arranged under the shields of the individual cables.

2. The cable distributor according to claim 1, wherein the conical support sleeves have a collar at one end.

3. The cable distributor according to claim 1, wherein the cable distributor has electrically conductive connection components that are provided with receivers, the surfaces of which are realized so as to be complementary to the shape of the conical support sleeves, and the connection components are arranged between the individual cables to be electrically connected, and effect an electrical contact to the shields of the individual cables.

4. The cable distributor according to claim 1, wherein the cable distributor has a plurality of connection pieces of individual cables, which are separated from each other by an insulating insert.

5. The cable distributor according to claim 1, wherein the shield housing is realized as a single part.

6. The cable distributor according to claim 1, wherein the shield housing is produced from an electrically conductive shield plate.

7. The cable distributor according to claim 1, wherein the outer housing is fixed by retaining caps at a position where it encloses the shield plate.

8. The cable distributor according to claim 1, wherein the outer housing has resilient tabs that clamp an insulation of an individual cable.

9. The cable distributor according to claim 1, wherein, arranged on the outer housing, there is a fixing element, which has resilient tabs that clamp an insulation of an individual cable.

10. The cable distributor according to claim 8, wherein the retaining caps have through-openings for the individual cables and are realized in such a manner that the retaining caps compress the resilient tabs arranged on the outer housing, or on the fixing element.

11. A method for assembling a cable distributor according to claim 1, the method comprising the following steps:
    pushing on a plurality of components,
    stripping insulation from the individual cables to be connected;
    shortening the shields of the individual cables;
    pushing on conical support sleeves under the shields of the individual cables;
    connecting the conductors of the individual cables in an electrically conductive manner;
    mounting an electrically insulating insert, such that one or more connection points are electrically insulated;
    pressing the connection components onto the conical support sleeves;
    pushing a shield housing over connection components and the insert;
    positioning an outer housing over the shield housing; and
    fixing the outer housing by means of retaining caps.

12. The method according to claim 11, wherein the method further comprises the step that, following positioning of the outer housing, a fixing element is additionally positioned.

13. A wiring harness, comprising a plurality of individual cables and a cable distributor according to claim 1.

* * * * *